Figure 1:
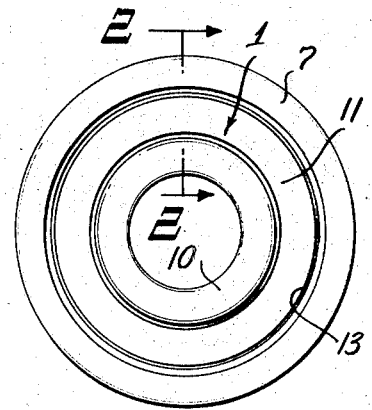

United States Patent

Bugmann

[15] 3,700,296
[45] Oct. 24, 1972

[54] ANTIFRICTION BEARING

[72] Inventor: Ernst Bugmann, Honggerstrasse 118, CH-8037 Zurich, Switzerland

[22] Filed: Jan. 15, 1971

[21] Appl. No.: 106,670

Related U.S. Application Data

[63] Continuation-in-part of Ser. Nos. 719,249, April 5, 1968, abandoned, and Ser. No. 738,023, June 18, 1968, abandoned.

[52] U.S. Cl.................308/187.2, 260/37 N, 277/95
[51] Int. Cl................................................F16c 33/78
[58] Field of Search ..........308/187.1, 187.2; 277/95; 260/37 N, 77.5 AN

[56] References Cited

UNITED STATES PATENTS

| | | | |
|---|---|---|---|
| 3,256,218 | 6/1966 | Knox | 260/37 N |
| 2,933,478 | 4/1960 | Young | 260/77.5 AN |
| 3,400,085 | 9/1968 | Kujawa | 260/37 N |
| 3,418,268 | 12/1968 | Hedrick et al. | 260/37 N |
| 3,464,935 | 9/1969 | Sepkoski | 260/37 N |
| 3,491,050 | 1/1970 | Keberle | 260/37 N |
| 3,336,086 | 8/1967 | Reinsma | 277/95 |
| 3,400,989 | 9/1968 | Dixon et al. | 308/187.2 |
| 3,473,856 | 10/1969 | Helms | 308/187.2 |

FOREIGN PATENTS OR APPLICATIONS

| | | | |
|---|---|---|---|
| 416,242 | 6/1965 | Switzerland | 277/95 |
| 1,099,142 | 1/1968 | Great Britain | 277/95 |

*Primary Examiner*—Martin P. Schwadron
*Assistant Examiner*—Barry Grossman
*Attorney*—Clelle W. Upchurch

[57] ABSTRACT

An antifriction bearing having radially spaced outer and inner races is provided with a polyurethane seal having glass fibers dispersed randomly therein between the races, the seal being an annulus which has an arcuate shaped body in longitudinal cross-section with its concave surface facing the interior of the bearing, an outer peripheral edge adapted to fit snugly in the outer race and an inner circumferential edge pressed against the surface of the inner race.

13 Claims, 4 Drawing Figures

Patented Oct. 24, 1972

3,700,296

INVENTOR
ERNST BUGMANN
BY
*Clelle W. Upchurch*
ATTORNEY

ANTIFRICTION BEARING

This invention relates to a seal or dust cover for antifriction bearings, a term used generally to include ball bearings, roller bearings, needle bearings and the like. This application is a continuation-in-part of my applications Ser. No. 719,249 filed Apr. 5, 1968, now abandoned and Ser. No. 738,023 filed June 18, 1968, now abandoned.

Antifriction bearings have long been in use without providing any means for keeping dust out and lubricant between the bearing surfaces that are in rolling contact with one another. In order to minimize pitting of these surfaces as well as "gumming" and loss of lubricant, various measures have heretofore been proposed for reducing the penetration of dust and dirt into the bearings and the leakage of lubricant therefrom. Such measures include felt ring gaskets, sleeve gaskets, spring washers and the like. These devices introduce problems of assembly which increase the cost of bearings, usually have a life considerably shorter than the life of the bearing to which they are applied and, therefore, require periodic replacement. They are also ineffective in completely or substantially completely avoiding penetration of dust into, or leakage of lubricant from, the bearings.

More recently it has been proposed to insert seals of sheet metal, thin in relation to the dimensions of the bearing, in a specially provided circumferential groove on the periphery of either the inner or outer race of the bearing. These seals must be very thin in order not to increase the dimensions of the bearings in either the axial or radial direction. While such seals are capable of keeping most of the dust from penetrating into the interior of the bearings, they are considerably less effective in avoiding loss of lubricant from the bearings to which they are applied. Attempts to overcome this deficiency by providing a rubber packing element acting as a cushion between a rotating race and the metal cover have not solved the problem satisfactorily because of the additional friction introduced and heat generated, the relatively short life of the rubber packing element and the increased difficulty and cost of assembly.

It is proposed in British Pat. specification No. 1,113,449 and Swiss Pat. No. 416,242 to use a natural or synthetic rubber or synthetic resin seal for ball or roller bearings. The seal has a flat body, an outer circumferential edge which fits in the groove of the bearing's outer race and an inner circumferential edge which lies against the surface of the inner race. Such a seal has not met with commercial success, however, because it frequently fails to seal completely the bearing against the loss of lubricant or the entrance of dirt or similar material.

It is therefore an object of this invention to provide an antifriction bearing having an improved seal which prevents the loss of lubricant and the entrance of foreign material into the bearing. Another object of the invention is to provide an improved synthetic resinous annulus for sealing the space between the outer and inner races of a bearing. A more specific object of the invention is to provide a bearing which has between its races a synthetic resinous annulus having improved physical properties which increase its effectiveness.

Figure 2:
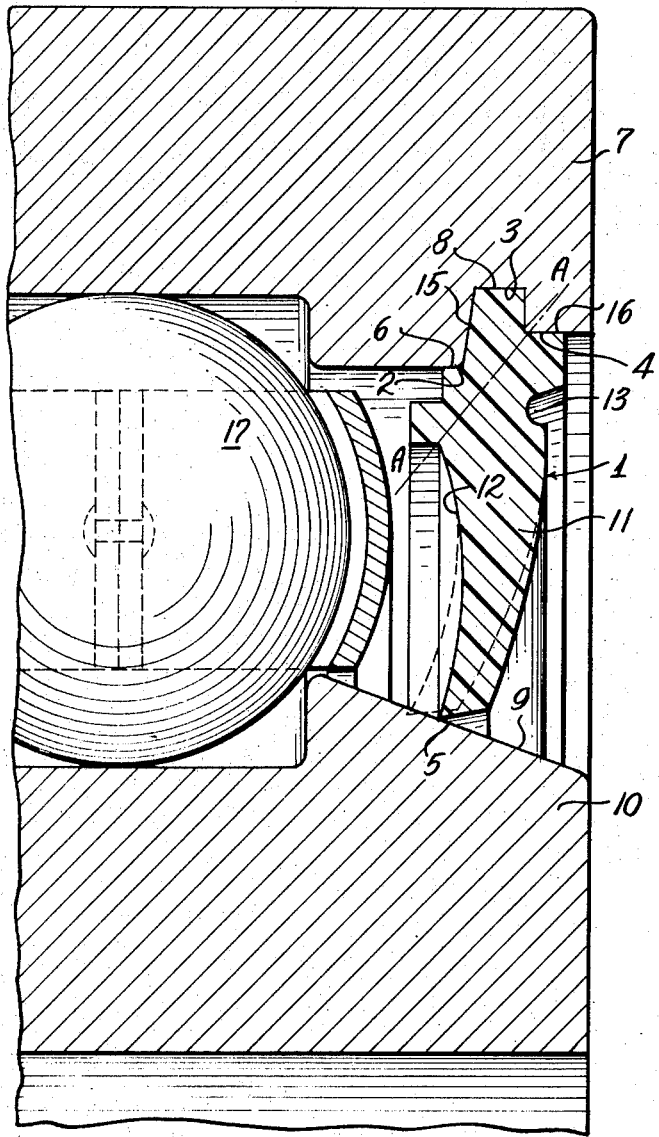

Other objects will become apparent from the following description with reference to the accompanying drawing wherein FIG. 1 is a front elevation of one embodiment of the invention; and FIG. 2 is a enlarged fragmentary sectional view taken along the line 2—2 of FIG. 1.

Figure 3:
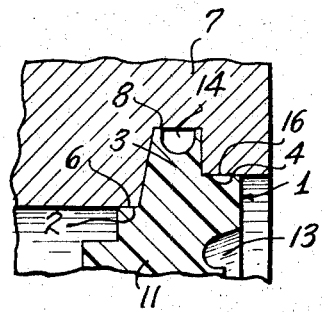
Figure 4:
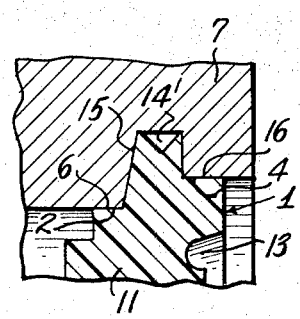

FIGS. 3 and 4 are enlarged fragmentary sectional views of modified forms of the annulus of FIG. 2.

In accordance with the present invention a seal capable of preventing penetration of dust and dirt into an antifriction bearing and also capable of sealing the bearing against loss or oxidation of lubricant is provided which is inexpensive and does not increase the dimensions of the bearing to which it is applied. In essence, it is an annulus of a fiberglass-reinforced polyurethane having outer and inner edges resiliently engageable with the outer and inner races, respectively, of a bearing. In the embodiment specifically described herein, the outer circumferential edge is adapted to fit snugly within the outer race of the bearing to which it is applied and the inner edge is adapted for resilient sliding and sealing contact with the inner race of the bearing. In the preferred structure of the seal of this invention, the thickness of the annulus diminishes toward the inner circumferential edge, i.e., the inner portion, of the annulus is considerably thinner than the outer portion, and the longitudinal cross-section of the annulus is arcuate, the concave side thereof being adapted to face the interior of the bearing.

In order to insure resilient sliding and sealing contact of the inner edge of the seal against the inner race of the bearing to which it is applied, the outer circumferential edge is preferably provided with a peripheral flange that is engageable with a mating circumferential groove in the outer race so that the inner edge is deflected slightly away from the interior of the bearing by the inner race when the peripheral flange is engaged with the mating circumferential groove. A similar initial stress may also be placed on the seal for resilient sliding and sealing contact between the inner edge of the annulus and the inner race of the bearing by making the diameter of the outer circumferential edge of the annulus slightly greater than the inside diameter of the outer race so that when the annulus is forced into the outer race, it will be flexed to provide positive contact between the inner edge of the annulus and the inner race of the bearing.

To facilitate assembly of the seal with the bearing and specifically to assist in engaging the outer edge or flange thereof with the inner surface or groove, respectively, of the outer race, an annular groove is preferably provided in the convex outer face of the annulus, said groove having a diameter somewhat smaller than the outer diameter of the annulus. Another groove may be provided in the outer circumferential edge, if desired in the peripheral flange, to further enhance the sealing capability of the annulus where it makes contact with the outer race. In addition, an annular shoulder may desirably be provided to facilitate radial centering or positioning of the seal on the bearing.

In order to reduce to a minimum the friction between the inner edge of the annulus and the inner race of the bearing with which it is in resilient sliding and sealing contact, it is desirable that this edge have a radius of curvature that is smaller than the thickness of the arcuate portion of the annulus adjacent the inner edge.

The seal of the present invention has a considerable number of advantages over metal dust covers heretofore in use. It generates considerably less noise, particularly at high speeds. Its inherent transparency facilitates inspection of the bearings, such as verifying whether the balls and cages, rollers and cages, etc. have been mounted properly, whether the proper amount of lubricant has been furnished, and the like. The seal of the invention also has the advantage of not being subject to metal fatigue and, therefore, of having a considerably longer life in its initial resilient and prestressed state, thus enhancing greatly its continuing ability to seal the bearing to which it is applied against penetration of dust and escape of lubricant. It is considerably less expensive to produce and assemble with a bearing than rubber-metal seals in conventional use, particularly inasmuch as the seal of the invention is of unitary construction. The very much lower coefficient of friction of fiberglass-reinforced polyurethane at the inner contact edge with the inner race of the bearing as compared with the rubber sleeve arrangement in conventional bearing covers permits considerably higher bearing speeds and avoids generation of excessive heat. Thus, for example, it was found that the sealing effectiveness of seals of the present invention on a given bearing was still excellent at speeds of 24,000 rpm whereas rubber-metal seals on a bearing of identical radial dimensions were effective only to speeds of 11,000 to 12,000 rpm. In addition, the strength, resilience and unitary construction of the seals of this invention make it possible to mount them on the bearings automatically with consequently lower production and installation costs, while at the same time eliminating the possibility of a permanent deformation of the outer race of the bearing, as often occurs when metal or rubber-metal seals are installed.

It is surprising that the seal of the invention requires the use of fiberglass-reinforced polyurethane, i.e., a polyurethane containing between about 1 and 20 percent by weight, preferably from about 5 and 20 percent by weight, of random fiberglass fibers, preferably in the form of fleece as described in my copending Application Ser. No. 719,249 filed April 5, 1968. This is required in order to give the seal, which must necessarily be very thin in relation to the dimensions of the bearing to which it is applied, sufficient strength and resilience to withstand the handling that is involved in assembly and to effectively seal the relatively movable inner and outer races of the bearing against penetration of dust and loss of lubricant. Fiberglass-reinforced polyurethane is readily obtainable with a modulus of elasticity in the range of 500 kg/cm$^2$ plus or minus 100 kg/cm$^2$, a range found to be most favorable for the purposes of this invention. In contrast, the modulus of elasticity of rubber is no higher than about 100 kg/cm$^2$, and even standard qualities of polyurethane without reinforcement do not attain moduli of elasticity of more than about 180 kg/cm$^2$. On the other hand, stiffer plastics, such as polyamide, polycarbonate and acetate resins, have moduli of elasticity of more than 8,000 kg/cm$^2$, which is too high to provide the resiliency required for effective sealing combined with minimum friction. Furthermore, fiberglass-reinforced polyurethane has the significant advantage, in its application to bearing seals, of having greatly superior dimensional stability to temperatures as high as 160°C.

Referring now to FIGS. 1 and 2 of the drawing for a more detailed description of an embodiment of the invention, a bearing having outer race 7, inner race 10 and ball 17 is provided with seal 1 which extends between outer race 7 and inner race 10 and seals the bearing against loss of lubricant and against the entrance of foreign material. Outer race 7 has an axially outer cylindrical surface 16 and an axially inner cylindrical surface 6 having a diameter less than the diameter of surface 16. An annular groove 8 is provided in race 7 between surfaces 16 and 6. Since the diameter of surface 6 is less than that of surface 16, an abutment 15 is provided.

Inner race 10 has a slanted or rounded surface 9 facing the outer race 7.

Injection molded polyurethane annulus 1 has about 10% by weight glass fibers, randomly dispersed therein. Annulus 1 has a peripheral edge 3 in the form of a flange extending outwardly from an outer circumferential shoulder 4 and an inner circumferential shoulder 2. Flange 3 fits snugly in groove 8, shoulder 4 fits tightly against outer cylindrical surface 16 and inner shoulder 2 fits tightly against surface 6. The back surface of flange 3 fits tightly against abutment 15. The diameter of the outer edge of flange 3 is slightly greater than the diameter of the bottom of groove 8 and the diameter of the inner edge of lip 5 is slightly less than the diameter of that portion of surface 9 against which lip 5 rests. As a result, when annulus 1 is snapped into position, lip 5 is preloaded as indicated by the dotted lines in FIG. 2. In other words, instead of lying in its normal unstressed position illustrated by the dotted lines it is flexed outwardly and is compressed between races 7 and 10. This insures that shoulder 4, flange 3, shoulder 2, surface 15 and lip 5 are tightly compressed against the opposing surfaces of the races.

The body 11 of annulus 1 is arcuate shaped in longitudinal cross-section and becomes thinner towards lip 5. The concave side 12 of annulus 1 faces the interior of the antifriction bearing. Typical dimensions are of the order of 0.4 mm. at the thickest point adjacent shoulder 2 and about 0.2 mm. adjacent the inner edge 5.

When annulus 1 is snapped into place with flange 3 in groove 8, it must bend along the axis A—A of FIG. 2 in order for lip 5 to rest against surface 9 instead of having the position illustrated in FIG. 2 with dotted lines. This preloads the inner edge 5 and tightly seals the bearing around its inner race 10. Annular groove 13 facilitates bending back shoulder 2 when annulus 1 is inserted into the outer race. A circumferential slot or groove 14 of rounded or wedge-shaped cross-section may be provided in flange 3 for improved sealing at the outer edge of the annulus 1.

It is, of course, to be understood that a reverse or complementary structure, in which the inner edge is mounted on the inner race in substantially the same manner as illustrated for the outer edge, and the outer edge is made to bear against the outer race for resilient sliding and sealing contact, may also be employed and is considered within the scope of the invention.

As indicated hereinbefore, the annulus preferably is made by injection molding a thermoplastic polyurethane having glass fibers dispersed therein. Best results are obtained with the substantially non-porous polyurethane described in my aforesaid copending application Ser. No. 719,249 filed April 4, 1968, and my continuation application of that application Ser. No. 106,927 filed Jan. 15, 1971. The polyurethane of the applications is prepared by reacting a polycaprolactone and a glycol chain extender with an organic diisocyanate such as, for example, diphenyl-4,4'-diisocyanate. Details of the preparation of the polyurethane are disclosed in the copending applications and will not be repeated here since the disclosure of the applications is incorporated herein by reference. Surprisingly, the product having the randomly oriented glass fibers dispersed therein is transparent which is advantageous if one wants an annulus which will permit one to see through it into the bearing.

Ordinarily, a larger opening is required for injection molding a resin having glass fibers dispersed therein, but contrary to expectations, a smaller gate may be used in injection molding the polyurethane having glass fibers dispersed therein than is required to injection mold the same polyurethane without glass fibers. This is important because the smaller gate aids in dispersing the fibers homogeneously through the polyurethane.

A glass fiber-filled polyurethane annulus provides a better seal around the inner race of the bearing than is provided by an annulus having a similar polyurethane composition but not containing glass fibers. The glass fiber-filled polyurethane has a greater modulus of elasticity than a polyurethane of the same composition which does not contain glass fibers. Consequently, a greater force is required to bend the annulus along axis A—A of FIG. 3 and to deflect lip 5 from the position shown by the dotted lines in FIG. 3 to a point of rest on surface 9 than is required to deflect the lip of an annulus of polyurethane which does not contain glass fibers. The "preload" on lip 5 is thus greater than it would be if a polyurethane not containing glass fibers were used.

The modulus of elasticity of most synthetic resins decreases with the addition of glass fibers, so it is surprising that the modulus of elasticity of a glass fiber filled polyurethane annulus is greater than that of one which is not glass fiber filled. Although an annulus made from a glass fiber filled thermoplastic poly(tetramethylene ether)—glycol polyurethane or a glass fiber filled thermoplastic polyester polyurethane of the types disclosed in U.S. Pat. No. 3,233,025 and U.S. Pat. No. 3,214,411 may be used, best results are obtained with a glass fiber filled poly(caprolactoneester)—polyurethane of the type disclosed in my aforesaid copending applications so an annulus made by injection molding the thermoplastic polyurethanes of the copending applications is preferred.

The elongation and hardness of the glass fiber filled polyurethane are not significantly affected by elevated temperatures such as are used in ASTM 1 and 3 Oil Aging Tests. Preferably, the elongation of glass fiber filled polyurethanes should be from about 400 to about 600 percent. It has been found that a glass fiber filled polyurethane having a high modulus of elasticity within the range required for best results can be obtained without significant loss in elongation. The improvement in resilience, modulus of elasticity and hardness are greatest with glass fiber filled polyurethanes which have been prepared by the reaction of a poly(caprolactoneester)glycol and a hydroquinone glycol ether with an organic diisocyanate so it is preferred to use a polyurethane annulus of that composition. Preferably, the hardness of a polyurethane annulus containing from about 5 to about 20 percent glass fibers should be from about Shore A 90° to about 98°.

Although the invention has been described in detail for the purpose of illustration, it is to be understood that such detail is solely for that purpose and that those skilled in the art can make variations therein without departing from the spirit and scope of the invention except as it may be limited by the claims.

What we claim is:

1. An antifriction bearing having an outer race provided with an inner annular groove between an axially outer cylindrical surface having a diameter less than the diameter of the bottom of the groove and an axially inner cylindrical surface having a diameter less than the diameter of the outer surface thereby providing an annular radially extending abutment surface facing outwardly from the bearing, said bearing having an inner race having a surface with a slanted or rounded profile in cross-section, and a substantially non-porous polyurethane annulus having glass fibers randomly dispersed therein enclosing the space between the two races, said annulus having a body which is arcuate shaped in longitudinal cross-section with its concave surface facing the interior of the bearing, an outer edge which extends radially outwardly from said body fitting snugly in the groove of the outer race, and a lip shaped inner circumferential edge preloaded against the said surface of the inner race, the diameter of the outer edge of the annulus being greater than the diameter of the bottom of said groove in the outer race whereby said annulus is compressed between the bottom of said groove and the surface of the inner race and flexed outwardly from the interior of the bearing.

2. The bearing of claim 1 wherein the annulus is poly(caprolactoneester)polyurethane.

3. The bearing of claim 1 wherein the annulus has a modulus of elasticity of from about 400 to about 600 kg/cm$^2$.

4. The bearing of claim 1 wherein the thickness of the annulus increases from the inner edge to the outer edge.

5. The bearing of claim 1 wherein the outer edge of the annulus is a peripheral flange having an annular groove.

6. The bearing of claim 1 wherein said annulus has a shoulder fitting against said axially outer cylindrical surface, one surface of said flange fitting against said abutment surface and a second shoulder fitting against said axially inner cylindrical surface and has a circumferential groove in its convex surface near the first said shoulder.

7. The bearing of claim 6 wherein the lip of the annulus touches the surface of the inner race only along its inner edge.

8. The bearing of claim 7 wherein said annulus contains from about 1 to about 20 percent by weight fibers.

9. The bearing of claim 1 wherein the annulus is transparent.

10. The bearing of claim 2 wherein the annulus has a modulus of elasticity of from about 400 to about 600 kg/cm$^2$ and the thickness thereof is greater at the outer edge than at the inner edge.

11. The bearing of claim 2 wherein the annulus has a shoulder fitting against said axially outer cylindrical surface, one surface of said flange fitting against said abutment surface and a second shoulder fitting against said axially inner cylindrical surface and has a circumferential groove in its convex surface near the first said shoulder.

12. In a bearing having spaced outer and inner races and an annulus sealing the space between the races, an improved seal comprising an injection molded substantially non-porous polycaprolactone polyurethane annulus which is arcuate shaped in cross-section and has glass fibers dispersed randomly therein whereby said annulus is substantially dimensionally stable at temperatures of up to 160°C. and has a modulus of elasticity of from about 400 to 600 Kg/cm$^3$.

13. The bearing of claim 12 wherein the annulus contains about 1 to about 20 percent glass fibers.

* * * * *